United States Patent
Ochiai

(10) Patent No.: US 8,762,676 B2
(45) Date of Patent: *Jun. 24, 2014

(54) MEMORY ACCESS CONTROL DEVICE, COMMAND ISSUING DEVICE, AND METHOD

(71) Applicant: Canon Kabushiki Kaisha, Tokyo (JP)

(72) Inventor: Wataru Ochiai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/939,099

(22) Filed: Jul. 10, 2013

(65) Prior Publication Data

US 2013/0297896 A1    Nov. 7, 2013

Related U.S. Application Data

(63) Continuation of application No. 12/208,001, filed on Sep. 10, 2008, now Pat. No. 8,516,214.

(30) Foreign Application Priority Data

Oct. 3, 2007    (JP) ................................ 2007-260357

(51) Int. Cl.
  *G06F 13/00*    (2006.01)
  *G06F 13/28*    (2006.01)
  *G06F 12/06*    (2006.01)

(52) U.S. Cl.
  USPC ..... 711/167; 711/154; 711/105; 711/E12.001

(58) Field of Classification Search
  None
  See application file for complete search history.

(56) References Cited

U.S. PATENT DOCUMENTS

| | | | |
|---|---|---|---|
| 7,222,224 B2 | 5/2007 | Woo et al. | |
| 2002/0188816 A1 | 12/2002 | Johnson et al. | |
| 2004/0022088 A1 | 2/2004 | Schaefer | |
| 2004/0103258 A1 | 5/2004 | Blackmon et al. | |
| 2005/0262323 A1 | 11/2005 | Woo et al. | |

FOREIGN PATENT DOCUMENTS

| | | |
|---|---|---|
| CN | 1977336 A | 6/2007 |
| JP | 02-114342 A | 4/1990 |
| JP | 2003-173290 A | 6/2003 |
| JP | 2008-500668 A | 1/2008 |
| WO | 2005-114669 A | 12/2005 |

OTHER PUBLICATIONS

Chinese Office Action dated Jun. 2, 1011 in Chinese Patent Application No. 200810148861.9.
Japanese Office Action dated Oct. 9, 2012, concerning Japanese Patent Application No. 2007-260357.

*Primary Examiner* — Eric S Cardwell
(74) *Attorney, Agent, or Firm* — Fitzpatrick, Cella, Harper & Scinto

(57) ABSTRACT

A memory access control device for controlling access to a plurality of memory devices with differing latency, controls, when performing a first access and then a second access, the timing of performing the second access, according to a memory device accessed in the first access and a memory device accessed in the second access.

7 Claims, 8 Drawing Sheets

FIG. 5

| COMMAND INTERVAL BUFFER | INTERVAL |
|---|---|
| 531a (MEMORY DEVICE 591 WRITE → MEMORY DEVICE 591 WRITE) | 3 CLOCK CYCLES |
| 531b (MEMORY DEVICE 591 WRITE → MEMORY DEVICE 591 READ) | 2 CLOCK CYCLES |
| 531c (MEMORY DEVICE 591 WRITE → MEMORY DEVICE 592 WRITE) | 3 CLOCK CYCLES |
| 531d (MEMORY DEVICE 591 WRITE → MEMORY DEVICE 592 READ) | 2 CLOCK CYCLES |
| 531e (MEMORY DEVICE 591 READ → MEMORY DEVICE 591 WRITE) | 5 CLOCK CYCLES |
| 531f (MEMORY DEVICE 591 READ → MEMORY DEVICE 591 READ) | 3 CLOCK CYCLES |
| 531g (MEMORY DEVICE 591 READ → MEMORY DEVICE 592 WRITE) | 5 CLOCK CYCLES |
| 531h (MEMORY DEVICE 591 READ → MEMORY DEVICE 592 READ) | 1 CLOCK CYCLES |
| 531i (MEMORY DEVICE 592 WRITE → MEMORY DEVICE 591 WRITE) | 3 CLOCK CYCLES |
| 531j (MEMORY DEVICE 592 WRITE → MEMORY DEVICE 591 READ) | 2 CLOCK CYCLES |
| 531k (MEMORY DEVICE 592 WRITE → MEMORY DEVICE 592 WRITE) | 3 CLOCK CYCLES |
| 531l (MEMORY DEVICE 592 WRITE → MEMORY DEVICE 592 READ) | 2 CLOCK CYCLES |
| 531m (MEMORY DEVICE 592 READ → MEMORY DEVICE 591 WRITE) | 7 CLOCK CYCLES |
| 531n (MEMORY DEVICE 592 READ → MEMORY DEVICE 591 READ) | 5 CLOCK CYCLES |
| 531o (MEMORY DEVICE 592 READ → MEMORY DEVICE 592 WRITE) | 7 CLOCK CYCLES |
| 531p (MEMORY DEVICE 592 READ → MEMORY DEVICE 592 READ) | 3 CLOCK CYCLES |

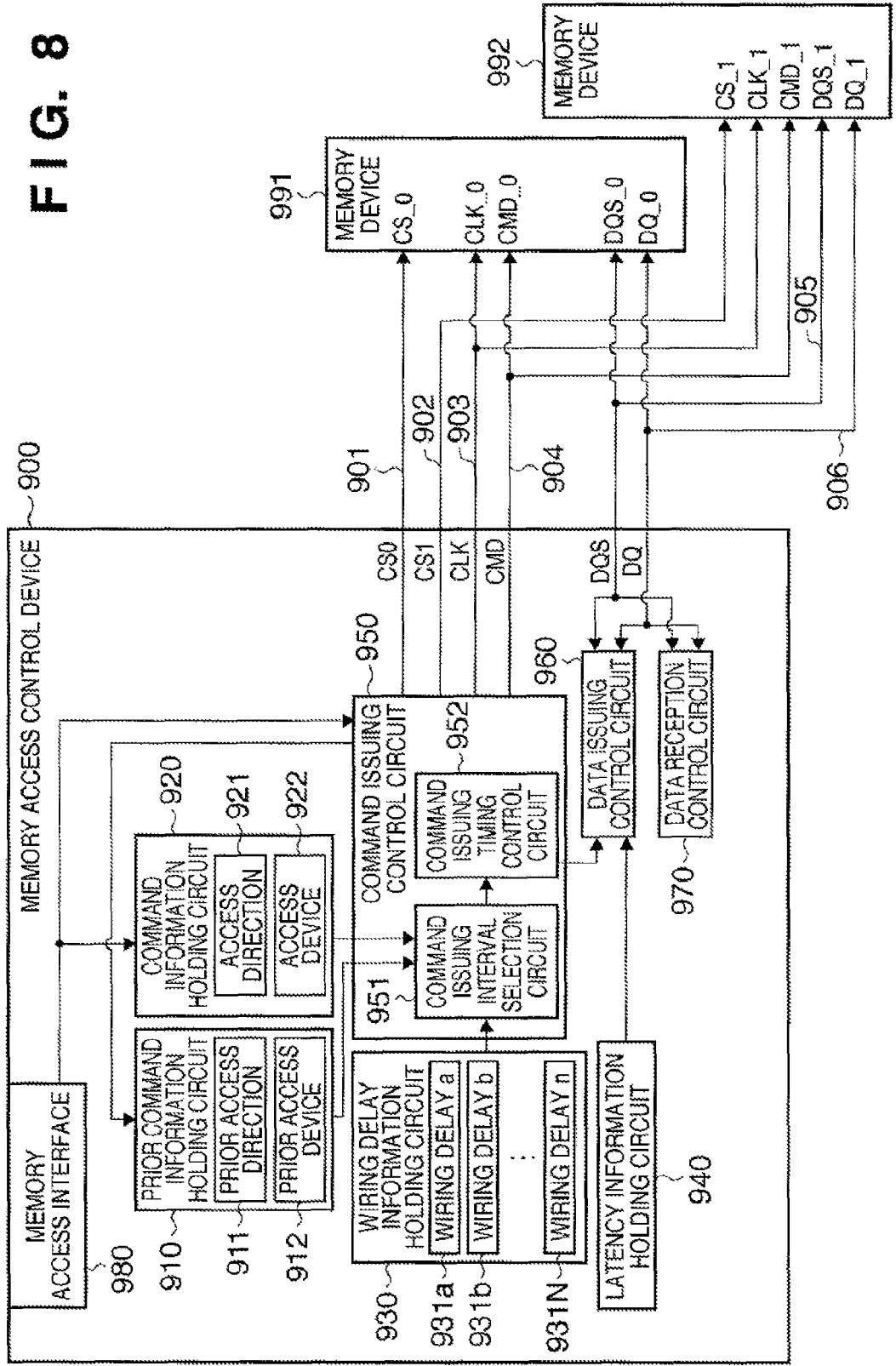

MEMORY ACCESS CONTROL DEVICE, COMMAND ISSUING DEVICE, AND METHOD

This application is a continuation of U.S. application Ser. No. 12/208,001, filed Sep. 10, 2008 (allowed), which claims priority from Japanese Patent Application No. 2007-260357, filed Oct. 3, 2007, the entire contents of each of which are incorporated by reference herein.

BACKGROUND OF THE INVENTION

1. Field of the Invention

The present invention relates to memory access control technology for controlling access to a plurality of memory devices with differing latency.

2. Description of the Related Art

Conventionally, substrates are designed such that wiring delay between large-scale integrated circuits (LSIs) and memory devices does not exceed one clock cycle of the memory. However, as operating frequencies rise, keeping the wiring delay from exceeding one clock cycle of the memory through substrate design has become difficult, and cases arises in which memory devices have differing access latencies.

Accordingly, memory access control circuits capable of accurately performing data exchange with a plurality of memory devices taking into consideration wiring delay have been considered (e.g., Japanese Patent Laid-Open No. 2003-173290).

FIG. 1 is a block diagram showing one example of a memory access control circuit in a conventional example. As shown in FIG. 1, memory devices 191 and 192 are connected to a memory access control circuit 100, and the memory access control circuit 100 controls access to the memory devices 191 and 192. Note that in the example shown in FIG. 1, DDR-type memory devices are used as the memory devices.

In FIG. 1, 101 is a chip select signal, and is asserted when the memory access control circuit 100 accesses the memory device 191. 102 is a chip select signal, and is asserted when the memory access control circuit 100 accesses the memory device 192.

103 is a clock signal, and is supplied to the memory devices 191 and 192 from the memory access control circuit 100. The memory devices 191 and 192 operate in synch with a clock signal 103. 104 is a command signal, and is issued to the memory devices 191 and 192 from the memory access control circuit 100. The memory devices 191 and 192 receive a command signal 104 when the corresponding chip select signals 101 and 102 are asserted, and perform processes corresponding to the content of the commands.

105 is a two-way data strobe signal. The memory access control circuit 100 and the memory devices 191 and 192 drive the data strobe signal 105 when data is transmitted. 106 is a two-way data signal. When writing, the memory access control circuit 100 drives the data signal 106 at a predetermined timing, and when reading, the memory device 191 or the memory device 192 drive the data signal 106 at a predetermined timing.

In the memory access control circuit 100, 110 is a prior command information holding circuit, and holds information on the command issued immediately before. It is provided internally with a prior access direction buffer 111 for holding the reading or writing direction of the command issued immediately before.

120 is a command information holding circuit, and holds information on the command to be issued next. It is provided internally with an access direction buffer 121 for holding the reading or writing direction of the command to be issued next.

130 is a command interval information holding circuit, and holds information on the minimum command issuing interval from issuing of the prior command to issuing of the next command. It is provided internally with command interval buffers 131a to 131d, and holds the minimum command issuing interval among all combinations of reading and writing directions of the prior command and reading and writing directions of the next command. In other words, in the example shown in FIG. 1, four sets of command intervals are held.

140 is a latency information holding circuit, and holds the read latency and write latency of memory devices corresponding to settings of memory devices connected to the memory access control circuit 100.

150 is a command issuing control circuit, and controls issuing of commands to the memory devices 191 and 192. A command issuing interval selection circuit 151 selects a relevant command interval from the command interval buffers 131a to 131d according to the prior access direction buffer 111 and the access direction buffer 121. Next, a command issuing timing control circuit 152 delays the timing for causing the next command to be issued by the command interval selected by the command issuing interval selection circuit 151.

160 is a data issuing control circuit, and drives the data signal 106 after a time period equivalent to the write latency held in the latency information holding circuit 140 has elapsed since the command issuing control circuit 150 issued a command. 170 is a data reception control circuit, and receives data read from the memory devices 191 and 192.

180 is a memory access interface, and receives memory access requests from external circuits, transmits commands to the command issuing control circuit 150, and sets reading or writing information to the access direction buffer 121.

A method for calculating the command issuing intervals to be set to the command interval buffers 131a to 131d is described below. The calculation method is as laid out in (1) to (4) below.

(1) Issuing a write command and then issuing a write command

> Command issuing interval=data transfer length/2+ minimum data interval (2) Issuing a write command and then issuing a read command > Command issuing interval=prior access device write latency+data transfer length/2+maximum access device wiring delay−next access device read latency−minimum access device wiring delay (3) Issuing a read command and then issuing a write command > Command issuing interval=maximum access device wiring delay×2+prior access device read latency+ data transfer length/2+minimum data interval− next access device write latency (4) Issuing a read command and then issuing a read command > Command issuing interval=maximum access device wiring delay×2+data transfer length/2+minimum data interval−minimum access device wiring delay×2

If a command is issued without satisfying the command issuing interval calculated using the above calculation method, there is the risk of collision between the driving of the data signals between the memory access control circuit 100 and the memory devices 191 and 192.

Note that read and write accesses between the memory access control circuit 100 and the memory devices 191 and 192 both use four-beat transfers.

The wiring delay between the memory access control circuit 100 and the memory device 191 is assumed to be 0.5 clock cycles, and the wiring delay between the memory access control circuit 100 and the memory device 192 is assumed to be 1.5 clock cycle. The read latency held in the latency information holding circuit 140 is assumed to be 3 clock cycles, and the write latency 2 clock cycles.

As described above, minimum command interval values are calculated based on the access length, the wiring delay, and the latency such that the driving of the data signal 106 by the memory access control circuit 100 and the memory devices 191 and 192 does not collide, and are set to the command interval buffers 131a-d.

In the conventional example, "data transfer length/2" is 2 clock cycles, since only four-beat memory access is handled. Further, the "minimum data interval" is the interval for preventing data which is continuously accessed from being contiguous in the data signal, and is ordinarily one clock cycle.

When the command issuing intervals are calculated using the above command issuing interval calculation method, the result is as follows. Namely, the following intervals (clock cycles) are set to the command interval buffers 131a to 131d, and clock cycles equal to at least those intervals are placed between commands.

(1) Issuing a write command and then issuing a write command (131a): 3 clock cycles
(2) Issuing a write command and then issuing a read command: 2 clock cycles
(3) Issuing a read command and then issuing a write command: 7 clock cycles
(4) Issuing a read command and then issuing a read command: 5 clock cycles Operation in a case in which the memory access control circuit 100 issues a read command to the memory device 192 and then issues a write command to the memory device 191 (operation example 1) is described now, with reference to FIG. 2.

FIG. 2 is a timing chart showing operation example 1 when issuing a command in the conventional example. In FIG. 2, the waveform marked as the memory access control circuit 100 is the waveform obtained by sampling the signal pin of the memory access control circuit 100. CLK, CS0, CS1, and CMD are output signals of the memory access control circuit 100, and DQS and DQ are input/output signals of the memory access control circuit 100.

The memory device 191 and the memory device 192 are waveforms obtained by sampling the signal pins of the memory devices. CLK_0, CS_0, and CMD_0, and CLK_1, CS_1, and CMD_1 are input signals of the memory devices, and DQS_0 and DQ_0, and DQS_1 and DQ_1 are input/output signals of the memory devices.

Information is set to the access direction buffer 121 by a memory access interface 180 to the effect that the next command is a read command. When the access direction buffer 121 is set, the command issuing interval selection circuit 151 notifies the command issuing timing control circuit 152 that there are 0 cycles until command issue is possible, since the prior access direction buffer 111 is empty.

On the other hand, the command issuing timing control circuit 152 receives the information that there are 0 clock cycles until command issue, and puts out a command issue permit after 0 clock cycles. The command issuing control circuit 150 asserts the chip select signal 102 and issues a read command (T3).

The command issuing control circuit 150 issues the command, and at the same time sets the information of the access direction buffer 121, indicating reading, to the prior access direction buffer 111. At the same time, the memory access interface 180 sets information to the access direction buffer 121 that the next command is a write command.

The read command issued by the command issuing control circuit 150 is received by the memory device 192 after a delay of 1.5 clock cycles (B4). Since the received command is a read command, the memory device 192 drives the data signal 106 after a read latency of 3 clock cycles has elapsed (B7). The data driven by the memory device 192 is received by the data reception control circuit 170 after a delay of 1.5 clock cycles (T10 to T12).

Since the prior command is a read command and the next command is a write command, the command issuing interval selection circuit 151 selects the command interval buffer 131c. The command issuing timing control circuit 152 is therefore notified that there are 7 clock cycles until command issue is possible.

The command issuing timing control circuit 152 receives the information that there are 7 clock cycles until command issue, and puts out a command issue permit after 7 clock cycles, starting from the issuing of the prior command (T3).

The command issuing control circuit 150 asserts the chip select signal 101 and issues a write command (T10). The command issuing control circuit 150 issues the command, and at the same time sets the information of the access direction buffer 121 to the prior access direction buffer 111.

The write command issued by the command issuing control circuit 150 is received by the memory device 191 after a delay of 0.5 clock cycles (A11). The data issuing control circuit 160 drives the data signal 106 after the write latency of 2 cycles held by the latency information holding circuit 140 has elapsed from the timing at which the command issuing control circuit 150 issued the write command (T13). The data issued by the data issuing control circuit 160 is received by the memory device 191 after a delay of 0.5 clock cycles (A13 to A15).

Next, operation in a case in which the memory access control circuit 100 issues a read command to the memory device 191 and then issues a write command to the memory device 192 (operation example 2) is described now, with reference to FIG. 3.

FIG. 3 is a timing chart showing operation example 2 when issuing a command in the conventional example. Note that the sampling points for the waveforms shown in FIG. 3 are the same as those in FIG. 2.

Information is set to the access direction buffer 121 by a memory access interface 180 to the effect that the next command is a read command. When the access direction buffer 121 is set, the command issuing interval selection circuit 151 notifies the command issuing timing control circuit 152 that there are 0 cycles until command issuing is possible, since the prior access direction buffer 111 is empty.

On the other hand, the command issuing timing control circuit 152 receives the information that there are 0 clock cycles until command issue, and puts out a command issue permit after 0 clock cycles. The command issuing control circuit 150 asserts the chip select signal 101 and issues a read command (T3).

The command issuing control circuit 150 issues the command, and at the same time sets the information of the access direction buffer 121, indicating reading, to the prior access direction buffer 111. At the same time, the memory access interface 180 sets information to the access direction buffer 121 that the next command is a write command.

The read command issued by the command issuing control circuit 150 is received by the memory device 191 after a delay of 0.5 clock cycles (A4). Since the received command is a read command, the memory device 191 drives the data signal 106 after a read latency of 3 clock cycles has elapsed (A7). The data driven by the memory device 192 is received by the data reception control circuit 170 after a delay of 0.5 clock cycles (T8 to T10).

Since the prior command is a read command and the next command is a write command, the command issuing interval selection circuit 151 selects the command interval buffer 131c. The command issuing timing control circuit 152 is therefore notified that there are 7 clock cycles until command issue is possible. The command issuing timing control circuit 152 receives the information that there are 7 clock cycles until command issue, and puts out a command issue permit after 7 clock cycles, starting from the issuing of the prior command (T3).

The command issuing control circuit 150 asserts the chip select signal 102 and issues a write command (T10). The command issuing control circuit 150 issues the command, and at the same time sets the information of the access direction buffer 121 to the prior access direction buffer 111.

The write command issued by the command issuing control circuit 150 is received by the memory device 192 after a delay of 1.5 clock cycles (B11). The data issuing control circuit 160 drives the data signal 106 after the write latency of 2 cycles held by the latency information holding circuit 140 has elapsed from the timing at which the command issuing control circuit 150 issued the write command (T13). The data issued by the data issuing control circuit 160 is received by the memory device 192 after a delay of 1.5 clock cycles (B13 to B15).

Only operation in a case of reading and then writing has been described, but cases of writing and then writing, writing and then reading, and reading and then reading are the same. In other words, relevant information is selected from the command interval buffers 131a to 131d by the command issuing interval selection circuit 151, and the command issuing timing control circuit 152 puts out an issuing permit according to the selected information. Data transfer is performed without driving of the data signal 106 colliding, since the command issuing control circuit 150 issues commands.

However, if the command issuing interval is controlled based on the reading/writing information of the prior command and the reading/writing information of the next command, there is a need to wait the command issuing interval to match the access to the memory device with the highest access latency.

A situation can arise in which data signals are not driven due to excessive gaps in the command issuing intervals, even when accessing memory devices with low access latency. For example, in the relevant art example above, in FIG. 3 memory access can be performed with no collision of the driving of the data signal 106 even if the writing command issued by the memory access control circuit 100 were issued 2 clock cycles earlier (T8).

Accordingly, a problem arises in that unnecessary transfer intervals are wasted during cycles in which data transfer is possible, lowering usage efficiency of the memory bus.

SUMMARY OF THE INVENTION

The present invention has as an object to access memory efficiently.

Another object of the present invention is to provide a memory access control device for controlling access to a plurality of memory devices with differing latency, including an accessing means for accessing the plurality of memory devices; and a controlling means for controlling, in a case in which the accessing means performs a first access and then a second access, the timing of performing the second access by the accessing means, according to a memory device accessed in the first access and a memory device accessed in the second access.

Another object of the present invention is to provide a command issuing device for issuing commands to a plurality of memory devices with differing latency, including an issuing means for issuing a command to one of the plurality of memory devices; and a controlling means for controlling, in a case in which the issuing means issues a first command and then a second command, the timing of issuing the second command by the issuing means according to a memory device receiving the first command and a memory device receiving the second command.

Further features of the present invention will become apparent from the following description of exemplary embodiments (with reference to the attached drawings).

BRIEF DESCRIPTION OF THE DRAWINGS

FIG. 5 is a view showing command issuing intervals calculated using a command issuing calculation method according to the first embodiment;

FIG. 8 is a block diagram showing one example of a memory access control circuit according a second embodiment.

DESCRIPTION OF THE EMBODIMENTS

Preferred embodiments for carrying out the invention are described in detail below, with reference to the drawings.

First Embodiment

Figure 1:
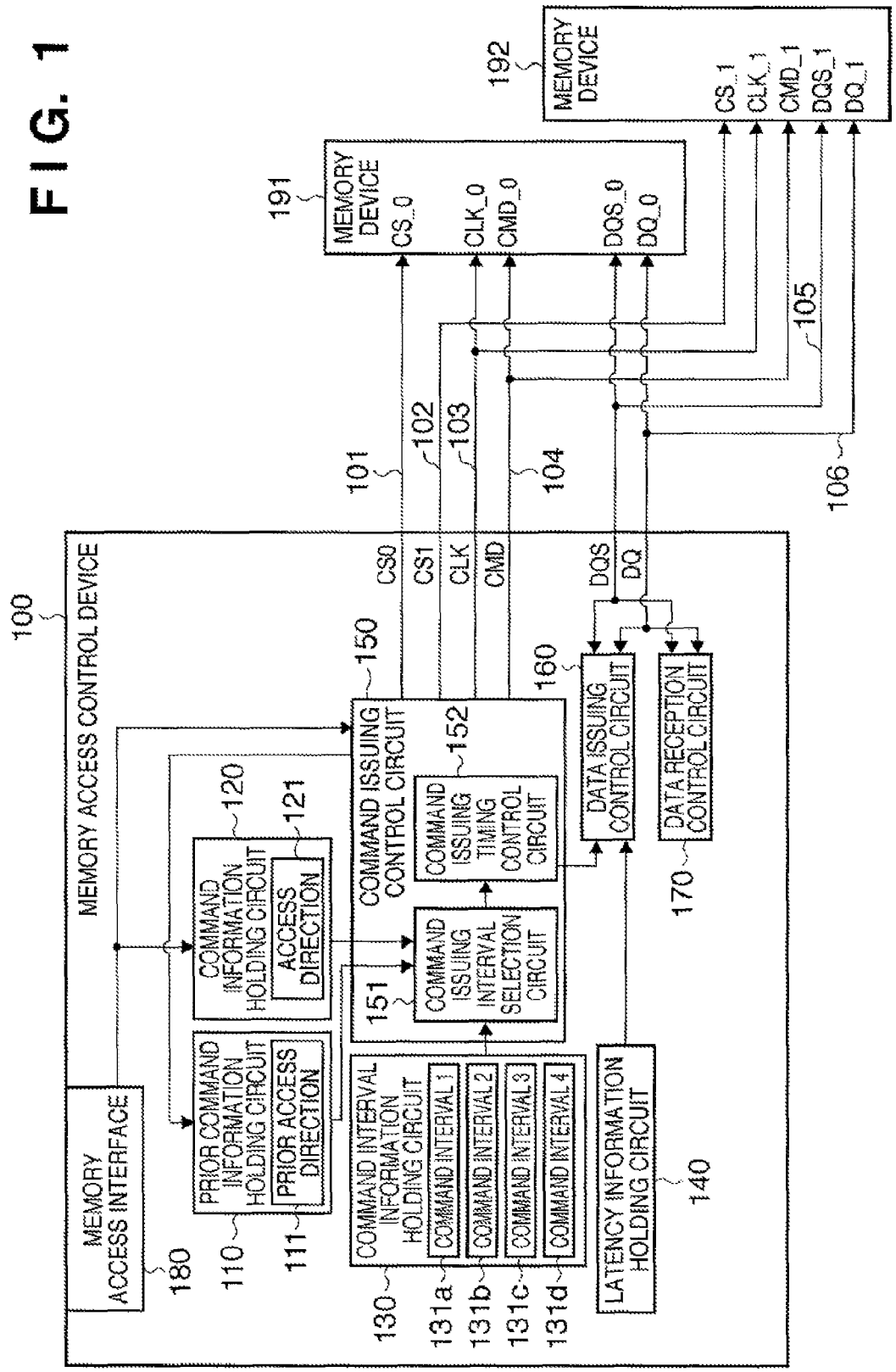
FIG. 1 is a block diagram showing one example of a memory access control circuit in a conventional example.
Figure 2:
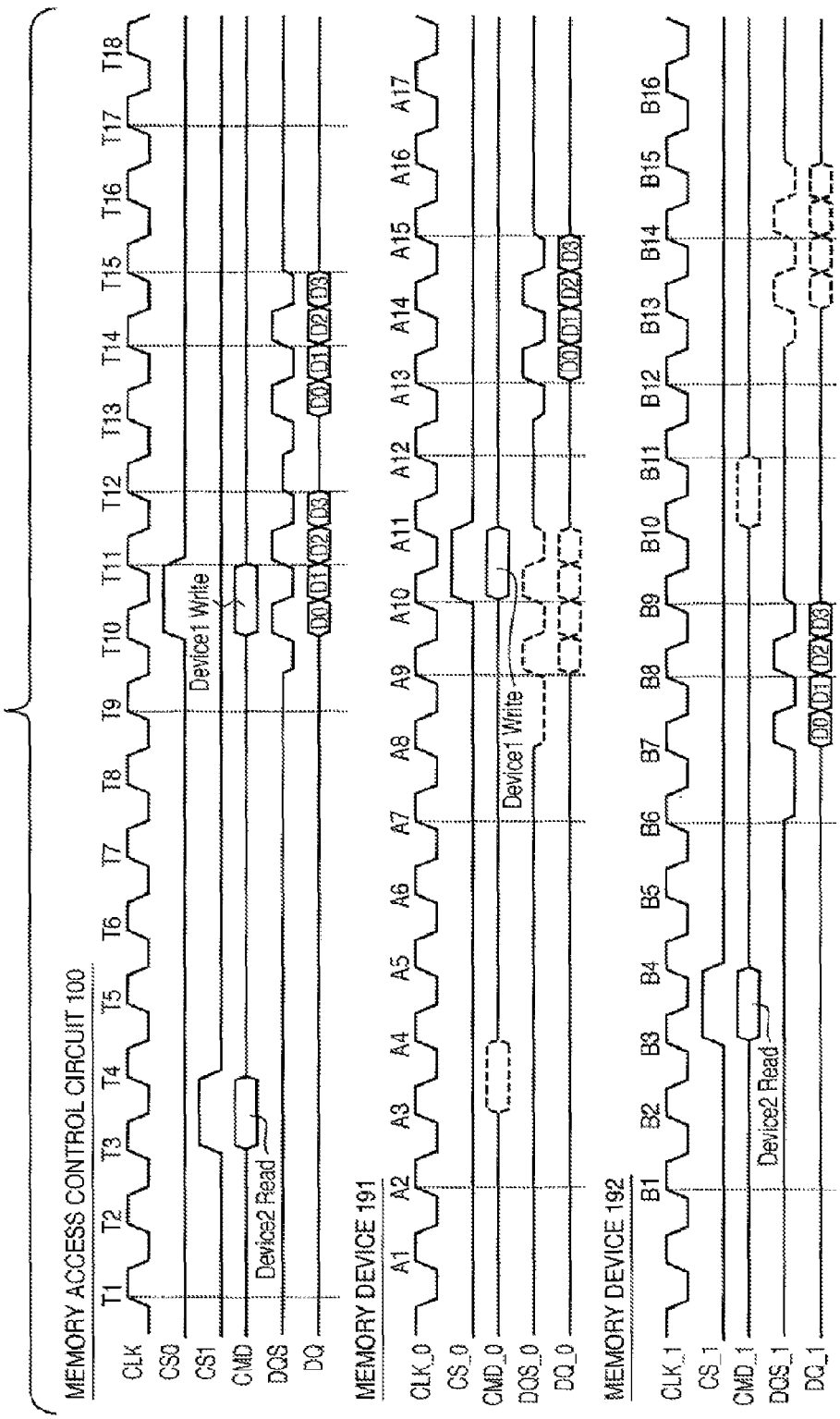
FIG. 2 is a timing chart showing operation example 1 when issuing a command in the conventional example.
Figure 3:
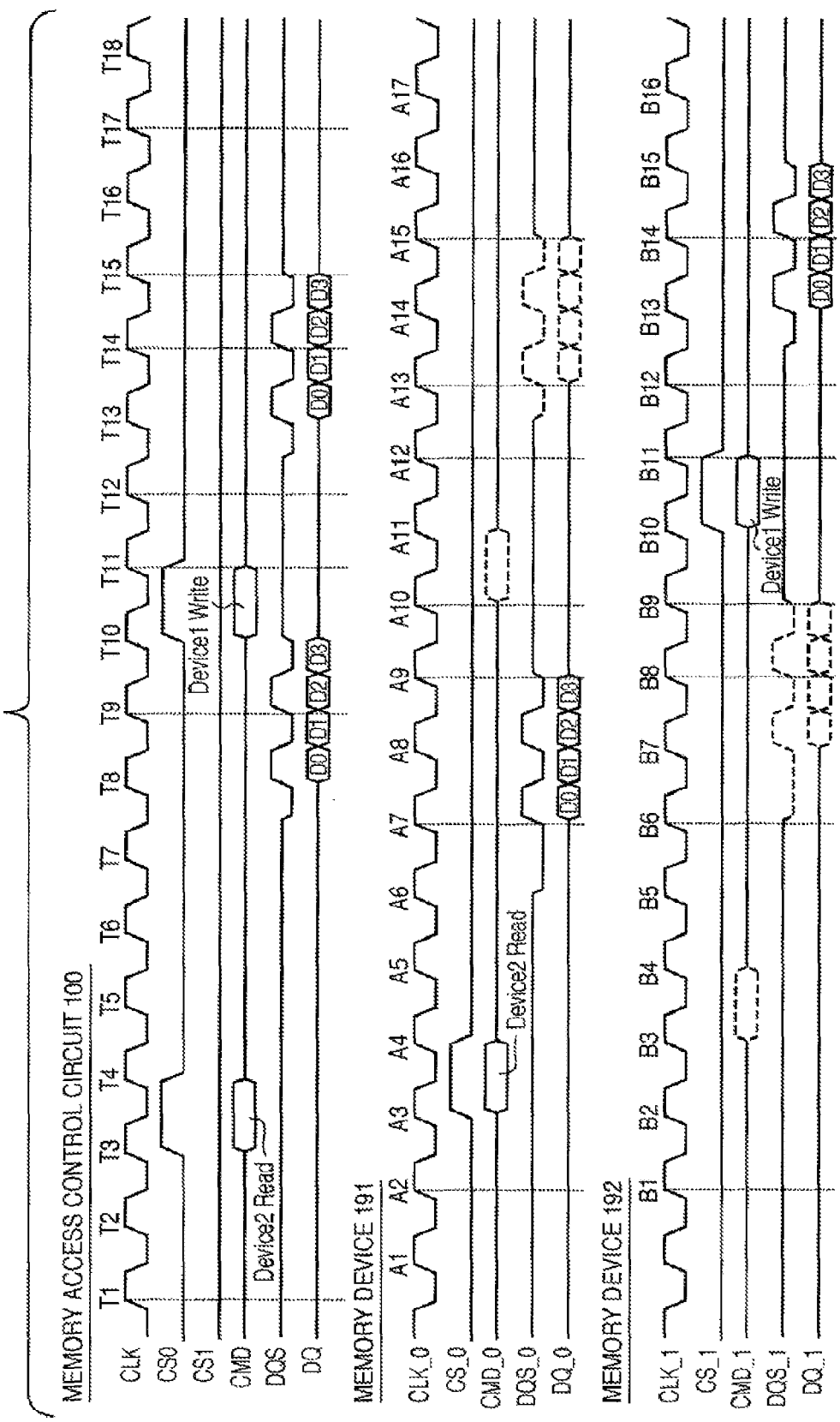
FIG. 3 is a timing chart showing operation example 2 when issuing a command in the conventional example.
Figure 4:
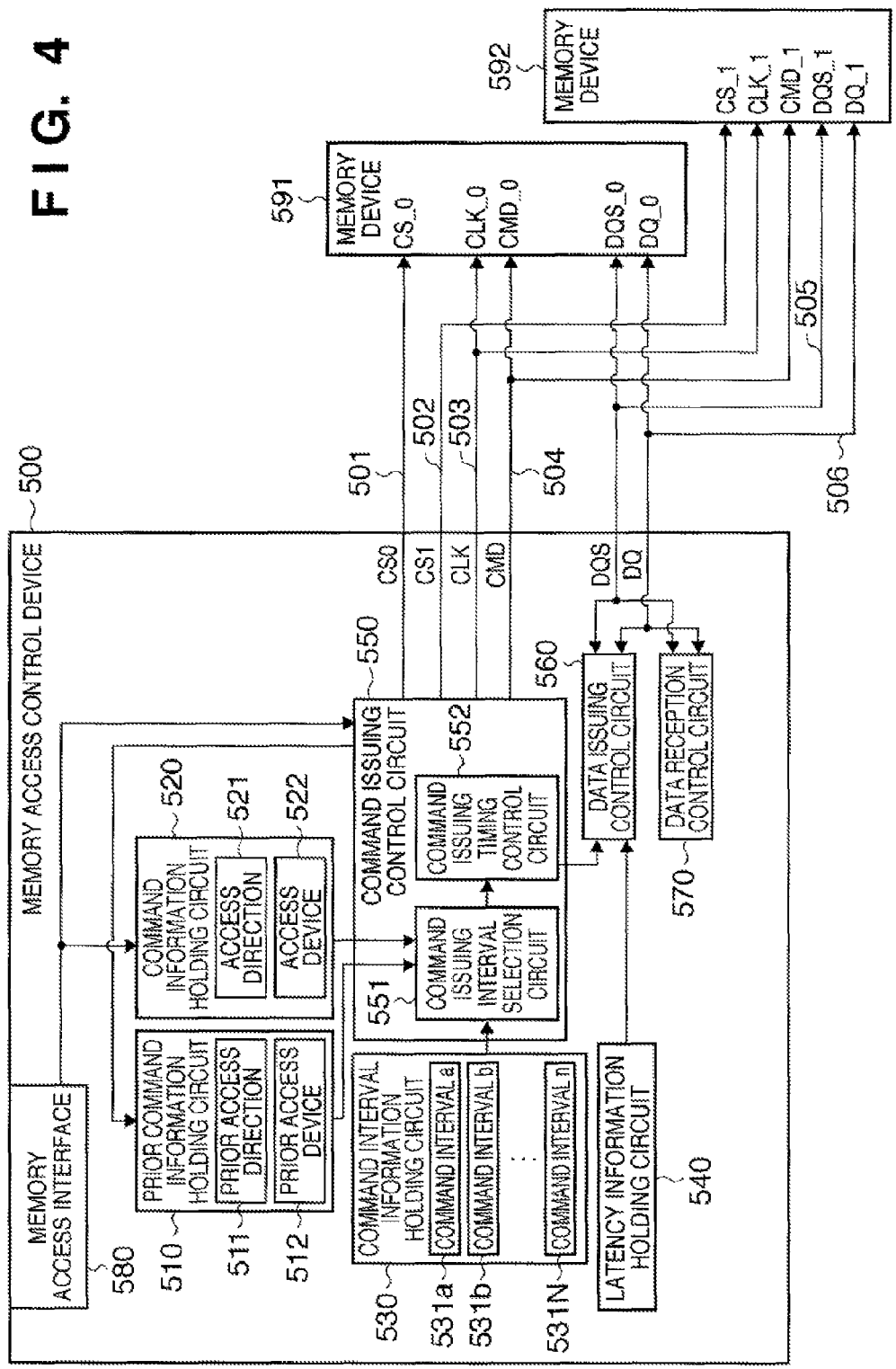
FIG. 4 is a block diagram showing one example of a memory access control circuit according a first embodiment.

FIG. 4 is a block diagram showing one example of a memory access control circuit according a first embodiment. As shown in FIG. 1, two memory devices 591 and 592 are connected to a memory access control device 500, and the memory access control device 500 controls access to the memory devices 591 and 592.

In the first embodiment, too, DDR-type memory devices are used as the memory devices. Description of signals 501 to 506 between the memory access control device 500 and the memory devices 591 and 592 is omitted, as these signals are the same as the signals 101 to 106 described using FIG. 1.

In the memory access control device 500, 510 is a prior command information holding circuit, and holds information on the command issued immediately before. The prior command information holding circuit 510 is internally provided with a prior access direction buffer 511 for holding the reading or writing direction of the command issued immediately before and a prior access device buffer 512 for holding information on the device accessed by the command issued immediately before.

520 is a command information holding circuit, and holds information on the command to be issued next. The command information holding circuit 520 is internally provided with an access direction buffer 521 for holding the reading or writing direction of the command issued to be issued next and an access device buffer 522 for holding information on the device accessed by the command to be issued next.

530 is a command interval information holding circuit, and holds information on the minimum command issuing interval from issuing of the prior command to issuing of the next command. The command interval information holding circuit 530 is provided internally with command interval buffers 531a to 531N, and holds the minimum command issuing interval among all combinations of access devices and reading and writing directions of the prior command and access devices and reading and writing directions of the next command. In the example shown in FIG. 4, 16 sets of command intervals are held, since two memory devices 591 and 592 are connected to the memory access control device 500. The total number of combinations N is found by 2×(number of devices)×2×(number of devices).

540 is a latency information holding circuit, and holds the read latency and write latency of memory devices corresponding to settings of memory devices connected to the memory access control device 500.

550 is a command issuing control circuit, and controls issuing of commands to the memory devices 591 and 592. The command issuing control circuit 550 may be constituted by a CPU (MPU), ROM, peripheral circuits, and so on. The command issuing interval selection circuit 551 selects a relevant command interval from the command interval buffers 531a to 531N according to the information held in the prior command information holding circuit 510 and the command information holding circuit 520. Next, a command issuing timing control circuit 552 delays the timing for causing the next command to be issued by the command interval selected by the command issuing interval selection circuit 551.

560 is a data issuing control circuit, and drives the data signal 506 after a time period equivalent to the write latency held in the latency information holding circuit 540 has elapsed since the command issuing control circuit 550 issued a command. 570 is a data reception control circuit, and receives data read from the memory devices 591 and 592.

580 is a memory access interface, and receives memory access requests from external circuits, transmits commands to the command issuing control circuit 550, and sets reading or writing information to the access direction buffer 521.

A method for calculating the command issuing intervals to be set to the command interval buffers 531a to 531N is described below. The calculation method is as laid out in (1) to (4) below.

(1) Issuing a write command and then issuing a write command $$\text{Command issuing interval} = \text{data transfer length}/2 + \text{minimum data interval}$$

(2) Issuing a write command and then issuing a read command $$\text{Command issuing interval} = \text{prior access device write latency} + \text{data transfer length}/2 + \text{prior access device wiring delay} - \text{next access device read latency} - \text{next access device wiring delay}$$

(3) Issuing a read command and then issuing a write command $$\text{Command issuing interval} = \text{prior access device wiring delay} \times 2 + \text{prior access device read latency} + \text{data transfer length}/2 + \text{minimum data interval} - \text{next access device write latency}$$

(4) Issuing a read command and then issuing a read command $$\text{Command issuing interval} = \text{prior access device wiring delay} \times 2 + \text{data transfer length}/2 + \text{minimum data interval} - \text{next access device wiring delay} \times 2$$

If a command is issued without satisfying the command issuing interval calculated using the above calculation method, there is the risk of collision between the driving of the data signals between the memory access control device 500 and the memory devices 591 and 592.

Note that read and write accesses between the memory access control device 500 and the memory devices 591 and 592 both use four-beat transfers.

The wiring delay between the memory access control device 500 and the memory device 591 is assumed to be 0.5 clock cycles, and the wiring delay between the memory access control device 500 and the memory device 592 is assumed to be 1.5 clock cycle. The read latency held in the latency information holding circuit 540 is assumed to be 3 clock cycles, and the write latency 2 clock cycles.

As described above, minimum command interval values are calculated based on the access length, the wiring delay, and the latency such that the driving of the data signal 506 by the memory access control device 500 and the memory devices 591 and 592 does not collide, and are set to the command interval buffers 531a to 531N.

Here, "data transfer length/2" is 2 clock cycles, since only four-beat memory access is handled. Further, the "minimum data interval" is the interval for preventing data which is continuously accessed from being contiguous in the data signal, and is ordinarily one clock cycle.

FIG. 5 is a view showing command issuing intervals calculated using a command issuing calculation method according to the first embodiment. In other words, the intervals (clock cycles) shown in FIG. 5 are set to the command interval buffers 531a to 531p (N is 16, so the letter attached is p), and a clock cycle greater than or equal to those intervals have to be waited.

Figure 6:
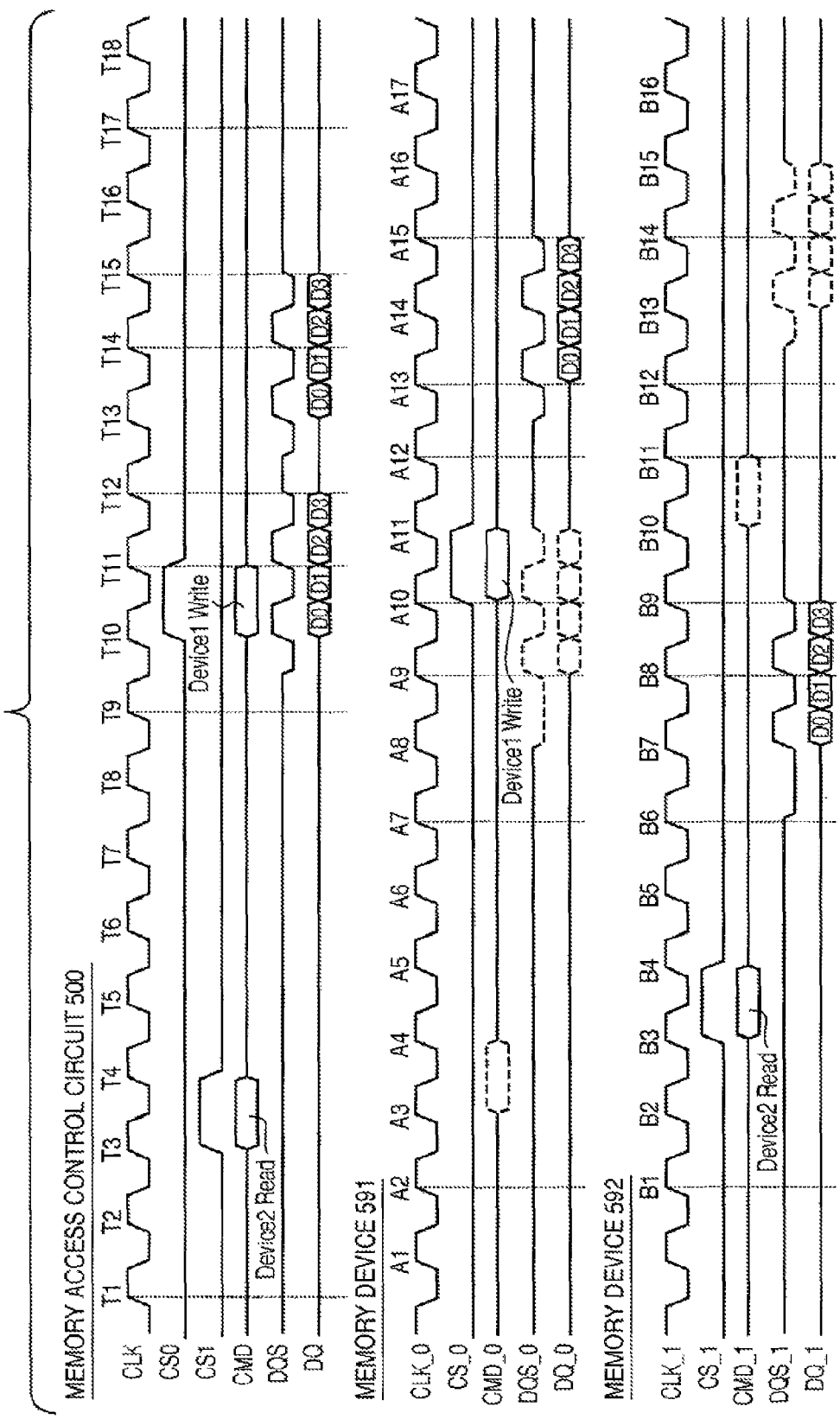
FIG. 6 is a timing chart showing operation example 1 when issuing a command according to the first embodiment.

Operation in a case in which the memory access control device 500 issues a read command to the memory device 592 and then issues a write command to the memory device 591 (operation example 1) is described now, with reference to FIG. 6.

FIG. 6 is a timing chart showing operation example 1 when issuing a command according to the first embodiment. Note that the waveform marked as the memory access control device 500 is the waveform obtained by sampling the signal pin of the memory access control device 500. CLK, CS0, CS1, and CMD are output signals of the memory access control device 500, and DQS and DQ are input/output signals of the memory access control device 500.

The waveforms marked as the memory device 591 and the memory device 592 are waveforms obtained by sampling the signal pins of the memory devices. CLK_0, CS_0, and CMD_0, and CLK_1, CS_1, and CMD_1 are input signals of the memory devices, and DQS_0 and DQ_0, and DQS_1 and DQ_1 are input/output signals of the memory devices.

Information is set to the access direction buffer 521 by a memory access interface 580 to the effect that the next command is a read command. When the access direction buffer 521 is set, the command issuing interval selection circuit 551 notifies the command issuing timing control circuit 552 that there are 0 cycles until command issuing is possible, since the prior access direction buffer 511 is empty.

On the other hand, the command issuing timing control circuit 552 receives the information that there are 0 clock cycles until command issue, and puts out a command issue permit after 0 clock cycles. The command issuing control circuit 550 asserts the chip select signal 502 and issues a read command (T3).

The command issuing control circuit 550 issues the command, and at the same time sets the information of the access direction buffer 521, indicating reading, to the prior access direction buffer 511. At the same time, the memory access interface 580 sets information to the access direction buffer 521 that the next command is a write command.

The read command issued by the command issuing control circuit 550 is received by the memory device 592 after a delay of 1.5 clock cycles (B4). Since the received command is a read command, the memory device 592 drives the data signal 506 after a read latency of 3 clock cycles has elapsed (B7). The data driven by the memory device 592 is received by the data reception control circuit 570 after a delay of 1.5 clock cycles (T10-T12).

Since the prior command is reading, the prior access device is the memory device 592, the next command is writing, and the next access device is the memory device 591, the command issuing interval selection circuit 551 selects the command interval buffer 531*m*. The command issuing timing control circuit 552 is therefore notified that there are 7 clock cycles until command issue is possible.

On the other hand, the command issuing timing control circuit 552 receives the information that there are 7 cycles until command issue, and puts out a command issue permit after 7 clock cycles.

The command issuing control circuit 550 asserts the chip select signal 501 and issues a write command (T10). The command issuing control circuit 550 issues the command, and at the same time sets the information of the access direction buffer 521 to the prior access direction buffer 511.

The write command issued by the command issuing control circuit 550 is received by the memory device 591 after a delay of 0.5 clock cycles (A11). The data issuing control circuit 560 drives the data signal 506 after the write latency of 2 cycles held by the latency information holding circuit 540 has elapsed from the timing at which the command issuing control circuit 550 issued the write command (T13). The data issued by the data issuing control circuit 560 is received by the memory device 591 after a delay of 0.5 clock cycles (A13 to A15).

Figure 7:
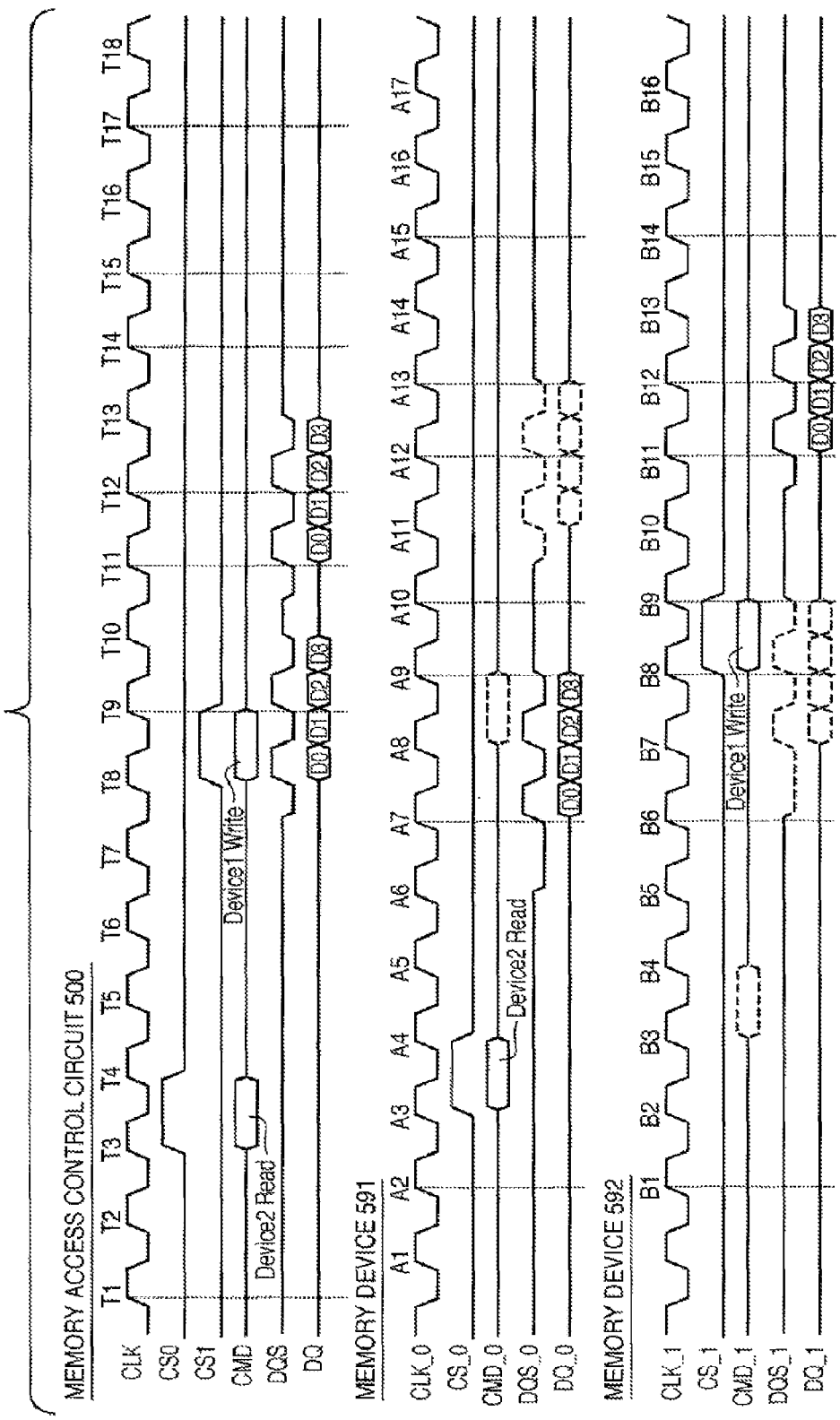
FIG. 7 is a timing chart showing operation example 2 when issuing a command according to the first embodiment.

Next, operation in a case in which the memory access control device 500 issues a read command to the memory device 591 and then issues a write command to the memory device 592 (operation example 2) is described now, with reference to FIG. 7.

FIG. 7 is a timing chart showing operation example 2 when issuing a command according to the first embodiment. Note that the sampling points for the waveforms shown in FIG. 7 are the same as those in FIG. 6.

Information is set to the access direction buffer 521 by a memory access interface 580 to the effect that the next command is a read command. When the access direction buffer 521 is set, the command issuing interval selection circuit 551 notifies the command issuing timing control circuit 552 that there are 0 cycles until command issue is possible, since the prior access direction buffer 511 is empty.

On the other hand, the command issuing timing control circuit 552 receives the information that there are 0 clock cycles until command issue, and puts out a command issue permit after 0 clock cycles. The command issuing control circuit 550 asserts the chip select signal 501 and issues a read command (T3).

The command issuing control circuit 550 issues the command, and at the same time sets the information of the access direction buffer 521, indicating reading, to the prior access direction buffer 511. At the same time, the memory access interface 580 sets information to the access direction buffer 521 that the next command is a write command.

The read command issued by the command issuing control circuit 550 is received by the memory device 591 after a delay of 0.5 clock cycles (A4). Since the received command is a read command, the memory device 591 drives the data signal 506 after a read latency of 3 clock cycles has elapsed (A7). The data driven by the memory device 592 is received by the data reception control circuit 570 after a delay of 0.5 clock cycles (T8 to T10).

Since the prior command is reading, the prior access device is the memory device 591, the next command is writing, and the next access device is the memory device 592, the command issuing interval selection circuit 551 selects the command interval buffer 531*g*. The command issuing timing control circuit 552 is therefore notified that there are 5 clock cycles until command issue is possible.

The command issuing timing control circuit 552 receives the information that there are 5 cycles until command issue, and puts out a command issue permit after 5 clock cycles.

The command issuing control circuit 550 asserts the chip select signal 502 and issues a write command (T8). The command issuing control circuit 550 issues the command, and at the same time sets the information of the access direction buffer 521 to the prior access direction buffer 511.

The write command issued by the command issuing control circuit 550 is received by the memory device 592 after a delay of 1.5 clock cycles (B9). The data issuing control circuit 560 drives the data signal 506 after the write latency of 2 cycles held by the latency information holding circuit 540 has elapsed from the timing at which the command issuing control circuit 550 issued the write command (T11). The data issued by the data issuing control circuit 560 is received by the memory device 592 after a delay of 1.5 clock cycles (B11 to B13).

Only operation in a case of reading and then writing has been described, but cases of writing and then writing, writing and then reading, and reading and then reading are the same. In other words, relevant information is selected from the command interval buffers 531*a* to 531N by the command issuing interval selection circuit 551, and the command issuing timing control circuit 552 puts out an issuing permit according to the selected information. Then, the command issuing control circuit 550 issues commands, and thus the data signal 506 can be driven in the shortest time possible without the driving of the data signal 506 colliding.

In the first embodiment, operation of a case in which access latencies of memory devices differed due to differing wiring delays. However, data signals can be driven in the shortest possible time without the driving of the data signals colliding, by setting command issuing intervals in the same way as in a case in which latency of memory devices differs.

In the first embodiment, a case in which two memory devices are connected is shown, but the present invention is not limited to only this, and is applicable to a case in which three or more devices are connected.

With the first embodiment, it is possible to adjust command issuing intervals according to information about whether the prior command is for reading or writing, information about which access device received the prior command, information about whether the next command is for reading or writing, and information about which access device will receive the next command. For this reason, there are no wasted transfer intervals in cycles during which data transfer is possible.

In other words, the memory bus can be used more efficiently without the timing at which the memory access control circuit drives a data signal colliding with the timing at which a memory device drives a data signal.

Second Embodiment

Next, a detailed described is given of a second embodiment according to the present invention with reference to the drawings. In the first embodiment, minimum command interval values are held in the command interval buffers 531a to 531N, but in the second embodiment, they are calculated when issuing the next command.

FIG. 8 is a block diagram showing one example of a memory access control circuit according a second embodiment. As shown in FIG. 8, a memory access control device 900 is connected to memory devices 991 and 992, and controls access to the memory devices 991 and 992.

In the second embodiment, too, DDR-type memory devices are used as the memory devices. Description of signals 901 to 906 between the memory access control device 900 and the memory devices 991 and 992 is omitted, as these signals are the same as the signals 501 to 506 described using FIG. 4.

In the memory access control device 900, 910 is a prior command information holding circuit, and holds information on the command issued immediately before. The prior command information holding circuit 910 is internally provided with a prior access direction buffer 911 for holding the reading or writing direction of the command issued immediately before and a prior access device buffer 912 for holding information on the device accessed by the command issued immediately before.

920 is a command information holding circuit, and holds information on the command to be issued next. The command information holding circuit 920 is internally provided with an access direction buffer 921 for holding the reading or writing direction of the command issued to be issued next and an access device buffer 922 for holding information on the device accessed by the command to be issued next.

930 is a wiring delay information holding circuit, and holds wiring delay information for all memory devices. It is provided internally with wiring delay buffers 931a to 931N, where wiring delay amounts for all the memory devices connected to the memory access control device 900 are held. In the example in FIG. 8, two memory devices 991 and 992 are connected to the memory access control device 900, which is provided with wiring delay buffers 931a and 931b, each holding two wiring delay amounts.

940 is a latency information holding circuit, and holds the read latency and write latency of memory devices corresponding to settings of memory devices connected to the memory access control device 900. 941 is latency information output to a command issuing control circuit 950.

950 is a command issuing control circuit, and controls issuing of commands to the memory devices 191 and 192. The command issuing control circuit 950 may be constituted by a CPU (MPU), ROM, peripheral circuits, and so on. A command issuing interval calculation circuit 951 calculates the number of cycles until the next command can be issued, based on the latency information 941 and information held in the prior command information holding circuit 910, the command information holding circuit 920, and the wiring delay information holding circuit 930. A command issuing timing control circuit 952 delays the timing for issuing the next command by the command interval calculated by the command issuing interval calculating circuit 951.

960 is a data issuing control circuit, and drives the data signal 906 after a time period equivalent to the write latency held in the latency information holding circuit 940 has elapsed since the command issuing control circuit 950 issued a command. 970 is a data reception control circuit, and receives data read from the memory devices 991 and 992.

980 is a memory access interface, and receives memory access requests from external circuits, transmits commands to the command issuing control circuit 950, and sets reading or writing information to the access direction buffer 921.

The calculating method for command issuing intervals by the command issuing interval calculating circuit 951 is as in (1) to (4) below.

(1) Issuing a write command and then issuing a write command

> Command issuing interval=data transfer length/2+ minimum data interval (2) Issuing a write command and then issuing a read command > Command issuing interval=prior access device write latency+data transfer length/2+prior access device wiring delay−next access device read latency−next access device wiring delay (3) Issuing a read command and then issuing a write command > Command issuing interval=prior access device wiring delay×2+prior access device read latency+data transfer length/2+minimum data interval−next access device write latency (4) Issuing a read command and then issuing a read command > Command issuing interval=prior access device wiring delay×2+data transfer length/2+minimum data interval−next access device wiring delay×2

If a command is issued without satisfying the command issuing interval calculated using the above calculation method, there is the risk of collision between the driving of the data signals between the memory access control device 900 and the memory devices 991 and 992.

Note that read and write accesses between the memory access control device 900 and the memory devices 991 and 992 both use four-beat transfers.

The wiring delay between the memory access control device 900 and the memory device 991 is assumed to be 0.5 clock cycles, and the wiring delay between the memory access control device 900 and the memory device 992 is assumed to be 1 clock cycle. The read latency held in the latency information holding circuit 940 is assumed to be 3 clock cycles, and the write latency 2 clock cycles.

The wiring delays of the memory device 991 and the memory device 992 are set to the wiring delay buffers 931a to 931N (N being the number of devices).

Operation in a case in which the memory access control device 900 issues a read command to the memory device 992 and then issues a write command to the memory device 991 (operation example 1) is described now, with reference to FIG. 6 which was referenced by the first embodiment.

Information is set to the access direction buffer 921 by a memory access interface 980 to the effect that the next command is a read command. When the access direction buffer 921 is set, the command issuing interval calculation circuit

951 notifies the command issuing timing control circuit 952 that there are 0 clock cycles until command issuing is possible, since the prior access direction buffer 911 is empty.

On the other hand, the command issuing timing control circuit 952 receives the information that there are 0 clock cycles until command issue, and puts out a command issue permit after 0 clock cycles. The command issuing control circuit 950 asserts the chip select signal 902 and issues a read command (T3).

The command issuing control circuit 950 issues the command, and at the same time sets the information of the access direction buffer 921, indicating reading, to the prior access direction buffer 911. At the same time, the memory access interface 980 sets information to the access direction buffer 921 that the next command is a write command.

The read command issued by the command issuing control circuit 950 is received by the memory device 992 after a delay of 1.5 clock cycles (B4). Since the received command is a read command, the memory device 992 drives the data signal 906 after a read latency of 3 clock cycles has elapsed (B7). The data driven by the memory device 992 is received by the data reception control circuit 970 after a delay of 1.5 clock cycles (T10-T12).

The command issuing interval calculation circuit 951 calculates based on the following information that there are 7 clock cycles until the next command can be issued using the command issuing interval calculating method described above, and notifies the command issuing timing control circuit 952.

- The prior command is a read command
- The prior access device is the memory device 992
- The next command is a write command
- The next access device is the memory device 991
- The wiring delay of the memory device 991 is 0.5 clock cycles
- The wiring delay of the memory device 992 is 1.5 clock cycles
- The read latency of the memory device is 3 clock cycles
- The write latency of the memory device is 2 clock cycles On the other hand, the command issuing timing control circuit 952 receives the information that there are 7 clock cycles until command issue, and puts out a command issue permit after 7 clock cycles.

The command issuing control circuit 950 asserts the chip select signal 901 and issues a write command (T10). The command issuing control circuit 950 issues the command, and at the same time sets the information of the access direction buffer 921 to the prior access direction buffer 911.

The write command issued by the command issuing control circuit 950 is received by the memory device 991 after a delay of 0.5 clock cycles (A11). The data issuing control circuit 960 drives the data signal 906 after the write latency of 2 cycles held by the latency information holding circuit 940 has elapsed from the timing at which the command issuing control circuit 950 issued the write command (T13). The data issued by the data issuing control circuit 960 is received by the memory device 991 after a delay of 0.5 clock cycles (A13 to A15).

Operation in a case in which the memory access control device 900 issues a read command to the memory device 991 and then issues a write command to the memory device 992 (operation example 2) is described now, with reference to FIG. 7 which was referenced by the first embodiment.

Information is set to the access direction buffer 921 by a memory access interface 980 to the effect that the next command is a read command. When the access direction buffer 921 is set, the command issuing interval calculation circuit 951 notifies the command issuing timing control circuit 952 that there are 0 clock cycles until command issuing is possible, since the prior access direction buffer 911 is empty.

On the other hand, the command issuing timing control circuit 952 receives the information that there are 0 clock cycles until command issue, and puts out a command issue permit after 0 clock cycles. The command issuing control circuit 950 asserts the chip select signal 902 and issues a read command (T3).

The command issuing control circuit 950 issues the command, and at the same time sets the information of the access direction buffer 921, indicating reading, to the prior access direction buffer 911. At the same time, the memory access interface 980 sets information to the access direction buffer 921 that the next command is a write command.

The read command issued by the command issuing control circuit 950 is received by the memory device 991 after a delay of 0.5 clock cycles (A4). Since the received command is a read command, the memory device 991 drives the data signal 906 after a read latency of 3 clock cycles has elapsed (A7). The data driven by the memory device 991 is received by the data reception control circuit 970 after a delay of 0.5 clock cycles (T8 to T10).

The command issuing interval calculation circuit 951 calculates based on the following information that there are 5 clock cycles until the next command can be issued using the command issuing interval calculating method described above, and notifies the command issuing timing control circuit 952.

- The prior command is a read command
- The prior access device is the memory device 991
- The next command is a write command
- The next access device is the memory device 992
- The wiring delay of the memory device 991 is 0.5 clock cycles
- The wiring delay of the memory device 992 is 1.5 clock cycles
- The read latency of the memory device is 3 clock cycles
- The write latency of the memory device is 2 clock cycles On the other hand, the command issuing timing control circuit 952 receives the information that there are 5 clock cycles until command issue, and puts out a command issue permit after 5 clock cycles.

The command issuing control circuit 950 asserts the chip select signal 901 and issues a write command (T8). The command issuing control circuit 950 issues the command, and at the same time sets the information of the access direction buffer 921 to the prior access direction buffer 911.

The write command issued by the command issuing control circuit 950 is received by the memory device 992 after a delay of 1.5 clock cycles (B9). The data issuing control circuit 960 drives the data signal 906 after the write latency of 2 cycles held by the latency information holding circuit 940 has elapsed from the timing at which the command issuing control circuit 950 issued the write command (T11). The data issued by the data issuing control circuit 960 is received by the memory device 992 after a delay of 1.5 clock cycles (B11 to B13).

Only operation in a case of reading and then writing has been described, but cases of writing and then writing, writing and then reading, and reading and then reading are the same. In other words, the command issuing timing control circuit 952 puts out an issue permit according to the command issuing interval calculated by the command issuing interval calculation circuit 951 using the command issuing interval calculation method described above. Then, the command issuing control circuit 950 issues commands, and thus data signal 906 can be driven in the shortest time possible without the driving of the data signal 906 colliding.

In the second embodiment, operation of a case in which access latencies of memory devices differed due to differing wiring delays. However, data signals can be driven in the shortest possible time without the driving of the data signals colliding, by calculating command issuing intervals in the same way as in a case in which latency of memory devices differs.

In the second embodiment, a case in which two memory devices are connected is shown, but the present invention is not limited to only this, and is applicable to a case in which three or more devices are connected.

Note that the present invention may be applied to system constituted by a plurality of devices (e.g., a host computer, an interface device, a reader, a printer, etc.), or to an apparatus made up of one device (e.g., a copier, a fax, etc.).

Further, a storage medium on which program code of software for realizing functionality of the embodiments described above is stored is supplied to a system or a device, and a computer (CPU or MPU) of the system or the device reads and executes the program code. The object of the present invention can be achieved in this manner as well.

In this case, the program code read from the computer-readable recording medium executes the functionality of the embodiments described above, and the recording medium on which the program code is stored constitutes the present invention.

Flexible disks, hard disks, optical disks, electromagnetic disks, CD-ROMs, CD-Rs, magnetic tape, non-volatile memory cards, ROMs, and so on can be used as storage media for supplying the program code.

The functionality of the embodiments described above is realized not only by executing the program code read by a computer, but the following cases are also included. In other words, an operating system (OS) running on the computer performs all or part of the actual processes based on the instructions in the program code, and the functionality of the embodiments described above is realized through those processes.

Further, the program code read from the storage medium is read into memory provided to a function enhancing board inserted into the computer or a function enhancing unit connected to the computer. This also includes cases in which a CPU, etc., provided to the function enhancing card or the function enhancing unit performs all or part of the actual processes based on the instructions of the program code and the functionality of the embodiments described above is realized through those processes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-260357, filed Oct. 3, 2007, which is hereby incorporated by reference herein in its entirety.

What is claimed is:

1. A memory access control device for controlling access to a plurality of memory devices with differing latency, comprising:
    an access unit configured to access the plurality of memory devices;
    a control unit configured to control, in a case where a first access and then a second access are performed by the access unit, the timing of performing the second access by the access unit in accordance with a memory device accessed in the first access, a memory device accessed in the second access, and access types of the first and second accesses, wherein the access type indicates whether the access is a read access or a write access, and
    a storage unit configured to hold one or more command issuing intervals corresponding to combinations of information of a prior command and information of a next command, wherein the information of the prior command and the information of the next command indicate a memory device to be accessed and read access or write access, wherein the control unit controls the timing based on the interval for a combination corresponding to the first access and the second access.

2. The device according to claim 1, wherein the control unit controls the timing of performing the second access by the access unit in accordance with latency of the memory device accessed in the first access and of the memory device accessed in the second access.

3. The device according to claim 1, wherein the control unit controls the timing of performing the second access by the access unit in accordance with wiring delay of the memory device accessed in the first access and of the memory device accessed in the second access.

4. The device according to claim 1, wherein the access unit connects the plurality of memory devices with a common data signal line.

5. A memory access control method for controlling access to a plurality of memory devices with differing latency, comprising:
    an access step of accessing the plurality of memory devices,
    a control step of controlling, in a case where a first access and then a second access are performed in the access step, the timing of performing the second access in the access step in accordance with a memory device accessed in the first access, a memory device accessed in the second access, and access types of the first and second accesses, wherein the access type indicates whether the access is a read access or a write access, and
    a storage step of holding one or more command issuing intervals corresponding to combinations of information of a prior command and information of a next command, wherein the information of the prior command and the information of the next command indicate a memory device to be accessed and read access or write access, wherein the control step controls the timing based on the interval for a combination corresponding to the first access and the second access.

6. The method according to claim 5, wherein the timing of performing the second access is controlled in the control step in accordance with latency of the memory device accessed in the first access and of the memory device accessed in the second access.

7. The method according to claim 5, wherein the timing of performing the second access is controlled in the control step in accordance with wiring delay of the memory device accessed in the first access and of the memory device accessed in the second access.

* * * * *